United States Patent
Jochim et al.

(10) Patent No.: US 9,540,190 B2
(45) Date of Patent: Jan. 10, 2017

(54) METHODS AND APPARATUS FOR CONTROLLING MOVEMENT OF RECEPTACLES

(71) Applicant: Amazon Technologies, Inc., Reno, NV (US)

(72) Inventors: Jayson Michael Jochim, Seattle, WA (US); Martin Peter Aalund, Seatte, WA (US); Jon Stuart Battles, Kirkland, WA (US); Paul Roy Raines, Jr., Seattle, WA (US); Yan Yan, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/682,993

(22) Filed: Apr. 9, 2015

(65) Prior Publication Data
US 2016/0297626 A1    Oct. 13, 2016

(51) Int. Cl.
| | |
|---|---|
| *B60L 13/03* | (2006.01) |
| *G06F 7/06* | (2006.01) |
| *B65G 54/02* | (2006.01) |
| *B65D 6/00* | (2006.01) |
| *B65D 25/20* | (2006.01) |

(52) U.S. Cl.
CPC .............. *B65G 54/02* (2013.01); *B65D 11/20* (2013.01); *B65D 25/205* (2013.01)

(58) Field of Classification Search
CPC .................................. B60L 13/03; G06F 7/06
USPC ........ 700/215, 217, 228, 229, 230; 104/289, 104/290, 292, 293
See application file for complete search history.

(56) References Cited

U.S. PATENT DOCUMENTS

| | | | |
|---|---|---|---|
| 5,054,601 A | 10/1991 | Sjogren et al. | |
| 5,251,741 A | 10/1993 | Morishita et al. | |
| 5,267,173 A * | 11/1993 | Tanizawa ............. | G05D 1/0261 104/88.03 |
| 5,631,617 A | 5/1997 | Morishita | |
| 5,668,421 A * | 9/1997 | Gladish ................... | B60L 13/10 104/23.2 |
| 6,206,170 B1 | 3/2001 | Kissel et al. | |
| 6,499,701 B1 * | 12/2002 | Thornton ................ | B60L 5/005 246/1 C |

(Continued)

FOREIGN PATENT DOCUMENTS

EP    0588378    3/1994

*Primary Examiner* — Douglas Hess
(74) *Attorney, Agent, or Firm* — Robert W. Morris; Seth Newman; Eckert Seamans Cherin & Mellott, LLC

(57) ABSTRACT

Methods and apparatus for controlling the movement of portable receptacles within a materials handling facility are described. The materials handling facility utilizes at least one linear induction motor (LIM) to move the portable receptacles having conductive elements from a first location to a second location within the facility. The LIMs may be configured such that most, if not all, of the movement of the receptacles is controlled by the application of energy from the LIMs to the conductive elements of the receptacles. This energy may cause the receptacles to move from one LIM to another LIM, where each LIM in sequence can apply force to the receptacle to pass it to the next LIM in the sequence. In some implementations, the portable receptacles are configured such that at least a base portion of the receptacle includes a conductive element to interact with the LIMs, while maintaining an overall light-weight configuration.

25 Claims, 9 Drawing Sheets

(56) References Cited

U.S. PATENT DOCUMENTS

| | | | | |
|---|---|---|---|---|
| 6,629,593 | B2 * | 10/2003 | Zeitler | B65G 43/08 |
| | | | | 198/460.1 |
| 6,876,896 | B1 | 4/2005 | Ortiz et al. | |
| 6,918,484 | B2 * | 7/2005 | Affaticati | B07C 5/36 |
| | | | | 198/357 |
| 7,035,714 | B2 * | 4/2006 | Anderson | B65G 13/02 |
| | | | | 198/358 |
| 7,212,884 | B2 * | 5/2007 | Kappelgaard | B65G 17/345 |
| | | | | 198/349 |
| 8,065,036 | B2 * | 11/2011 | Linke | G05B 19/41815 |
| | | | | 700/230 |
| 8,267,634 | B2 * | 9/2012 | Bufano | H01L 21/67017 |
| | | | | 104/281 |
| 8,428,770 | B2 * | 4/2013 | Lund | G05B 19/41895 |
| | | | | 104/88.01 |
| 8,683,926 | B2 * | 4/2014 | Shapery | B60L 13/03 |
| | | | | 104/284 |
| 8,825,205 | B2 * | 9/2014 | Yokota | B65G 43/00 |
| | | | | 104/88.01 |
| 8,892,240 | B1 * | 11/2014 | Vliet | B65G 1/1378 |
| | | | | 700/213 |
| 9,050,896 | B2 * | 6/2015 | Brier | B60L 13/03 |
| 9,346,371 | B2 * | 5/2016 | King | B60L 13/003 |

* cited by examiner

METHODS AND APPARATUS FOR CONTROLLING MOVEMENT OF RECEPTACLES

BACKGROUND

Each passing day, more and more consumers utilize the internet to purchase goods. This has resulted in an ever growing use of fulfillment centers, distribution centers, warehouses and materials handling facilities (collectively, "materials handling facilities") as the places where the goods are received, stored, prepared for shipment, and even potentially shipped (shipment may, for example, occur at a separate facility). When a consumer orders a specific item, the ordered number of units of that item are identified at one or more specific locations within the materials handling facility, transferred to another location within the facility for packaging in a shipment container (such as a cardboard box), and prepared for shipment to the consumer.

Conventional materials handling facilities typically utilize a series of conveyor belts which deliver generic totes or receptacles from one specific location to another within the material handling facility. These conveyor belts are usually operated in an "always on" mode, in which they are constantly moving, even if no receptacles are being moved. Keeping these conveyors constantly moving can require a significant allocation of energy, as the conveyor belts themselves are often very heavy. In addition, such systems are inherently very noisy due to the constant movement of the conveyors, and all of the moving parts can require frequent maintenance and generate large amounts of dust and dirt, which can reduce the reliability of such systems.

DETAILED DESCRIPTION

Figure 1:
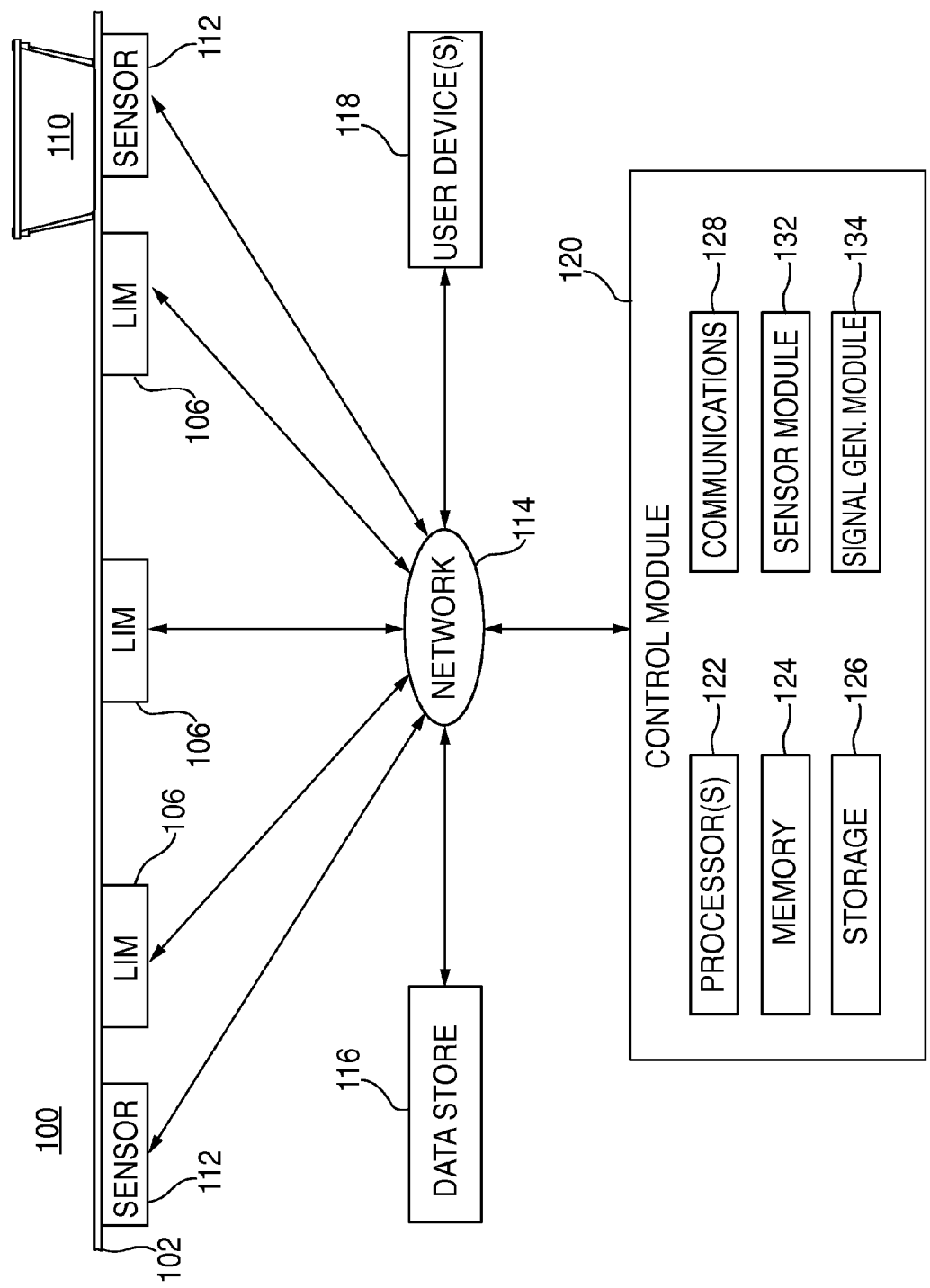
FIG. 1 shows an illustrative schematic view of a linear induction motor-driven materials handling system in accordance with embodiments of the present disclosure.

The present disclosure, as set forth below, is directed to various embodiments of methods and apparatus for transporting portable receptacles utilizing linear induction motor-driven materials handling systems. In some embodiments, linear induction motors ("LIMs") are used as a mechanism for transporting individual portable receptacles from a first location to a second location within the given materials handling system. In other embodiments, a single LIM may be utilized to move multiple portable receptacles from a first location to a second location in the system, whereby the LIM causes a first portable receptacle to begin moving and the electromagnetic force generated by the LIM is strong enough to move a series of receptacles located adjacent to each other within the system. In at least some embodiments, the LIMs are sized and configured such that the portable receptacles are at least partially levitated to reduce the force needed to drive the receptacles within the system by reducing the frictional force between the portable receptacles and the surface on which they move. In at least some other embodiments, individual portable receptacles can be moved from any one of many given starting positions to any one of many given intermediate positions and/or end positions. At some of those intermediate positions, for example, additional items made be added to the receptacle in order to build the order before it is packaged for shipment. In this manner, for example, a given portable receptacle might be utilized to accumulate multiple items in a given consumer's order, rather than simply being utilized to a transport a given item within the system.

In some embodiments, a materials handling system includes one or more guide tracks to guide the portable receptacles. Each guide track may include a receiving surface that includes one or more LIMs and one or more side walls capable of guiding the portable receptacles and/or limit the movement of the portable receptacles such that the portable receptacles stay within the confines of the materials handling system. In some embodiments, the direction in which a given portable receptacle is traveling may be altered via the intervention of a physical device, such as a guide arm operable via a switch to redirect the receptacle from a given path toward point A to a given path toward point B. In at least some other embodiments, the direction in which a portable receptacle is moving is altered via one or more LIMs oriented such that the one or more LIMs alter the trajectory of the portable receptacle from a first path to a second path.

While many embodiments described herein relate to materials handling system and the various ways that such systems utilize LIMs to move portable receptacles to different locations within a materials handling system, at least some embodiments are directed to the portable receptacle itself. In many instances, portable receptacles are, by their nature, light-weight, but sturdy devices that can be used to transport one or more items ranging in weight from very light (e.g., less than 10 ounces) to very heavy (e.g., greater than 20 pounds). Accordingly, portable receptacles may be manufactured from one or more non-conductive materials including, but not limited to, various plastics (e.g., polyethylene terephthalate ("PET"), polypropylene, polystyrene, etc.), rigid rubber, and/or cardboard, and combinations thereof. Such non-conductive materials are capable of providing the necessary rigidity and strength for the portable receptacle while maintaining the light-weight form factor needed to facilitate movement of the portable receptacles throughout the materials handling system.

However, while portable receptacles made of such non-conductive materials are suitable for most materials handling systems operating using standard conveyer belts and pulley systems, these receptacles are not capable of interacting with a materials handling system including one or more LIMs as mechanisms to move the portable receptacles from one location to another within the materials handling system, such that the portable receptacles themselves are part of the driving motor. For example, in conventional LIM-based systems, the LIM carriers (i.e., the stator portion of the linear motor) are designed to hold the receptacles securely in place while the carriers transport the receptacles about the system. In accordance with embodiments described below, the portable receptacles are modified to include conductive materials such that the receptacles themselves take the place of conventional LIM carriers and are therefore an integral part of the linear motors that are used to move the receptacles about the system, which can greatly reduce the number of moving parts required in these systems. In some embodiments, portable receptacles may be made solely of conductive materials (e.g., iron, copper, etc.). However, creating portable receptacles solely out of conductive materials may be costly, and may create receptacles that are too heavy or cumbersome to move efficiently within the materials handling system.

In some embodiments, the portable receptacles may be modified or redesigned such that at least a portion of the portable receptacle includes a conductive element that can interact with the LIMs in the materials handling system, while the remaining portions of the portable receptacle include one or more non-conductive materials. These conductive materials may be attached to the inner or outer surface of the receptacles, or they may be embedded within the non-conductive portion of the receptacles during the manufacturing of the receptacles. In other embodiments, the material used to manufacture the receptacles may be doped with an appropriate amount of conductive material such that the receptacles are produced in a manner that they can reliably interact with the LIMs in the material handling system. For example, the portable receptacles can, for example, be manufactured with a portion of conductive material located in a bottom portion of the receptacles, or the bottom portion of the receptacle can be impregnated with multiple individual conductive portions, such as conductive strips that may be utilized to assist in transporting and/or changing the direction of a given receptacle in the system. Alternately, some or all of the portable receptacles may be formed of a non-conductive material that is doped with one or more conductive elements or particles, for example, as part of an injection-molding process (this may be accomplished, for example by utilizing the doped material when forming the bottom of the receptacle and non-doped material when forming the side walls to keep the receptacles as light and inexpensive as possible).

Embodiments described below include materials handling systems that utilize one or more LIMs to facilitate movement of portable receptacles that are at least partially conductive, such that the receptacles themselves form part of the driving inductive motor. In this manner, the materials handling systems utilize less energy because only the driving LIMs need to be active, and they generate less noise and dirt due to the significant reduction in moving parts in the transport system itself. Further, the reduction in moving parts may reduce the need for frequent or periodic maintenance of such moving parts. In addition, the reduced amount of friction between the portable receptacle and guide track allows for the portable receptacles to travel substantially unimpeded and with great efficiency. In some embodiments, the electromagnetic forces between the LIMs and the conductive elements of the portable receptacles enable the portable receptacles to levitate above the guide track, thereby substantially removing any frictional forces. Another beneficial aspect of such materials handling systems is that the amount of energy needed to operate the one or more LIMs is much less than for a typical conveyance system as only enough energy is needed to "push" one receptacle from one LIM to a next LIM. A further advantage of such materials handling systems is that the systems are substantially deterministic, such that the position of each portable receptacle should be capable of being calculated beforehand, regardless of the weight of the receptacle or of any item placed therein.

FIG. 1 shows an illustrative schematic view of material handling system 100, which includes receiving surface 102, linear induction motors ("LIMs") 106, one or more sensors 112, a network 114, a data store 116, and a control module 120. System 100 may also include one or more user devices 118 that can be used to access, monitor and/or control various aspects of system 100. Sensors 112 may include any number and variety of different sensors, depending on the application. For example, sensors 112 may, in some embodiments, be used to monitor the location and/or contents of receptacle 110 as it travels about materials handling system 100, and this could be accomplished in a number of different ways, such as through the use of RFID tags attached to receptacle 110 or items contained therein, in which case sensors 112 would be RFID readers. Alternately, an identifier, e.g., a sticker, could be placed on each receptacle 110 or item contained therein that can include a QR or bar code, in which case sensors 112 would be a corresponding scanner/reader. Other embodiments can include imaging sensors, thermal sensors, photographic imaging devices, etc. Still other embodiments may include sensors that can measure the weight of receptacle 110, which could be used to verify that certain selected items have been placed therein (in which case the individual weight of such items would be known).

As indicated above, system 100 may also include one or more user devices 118 that can be used by employees working with system 100 to fulfill customer orders. In some embodiments, user devices 118 could be any one of a number of smartphones, running a dedicated "app" that could interface with system 100 via a Bluetooth or WiFi connection (through communications module 128 in control module 120). Alternatively, user devices 118 could be tablet computers that could also be configured to run a dedicated app and be connected to system 100 via a Bluetooth or WiFi connection. In addition, user devices 118 could instead be dedicated hand held devices that are designed specifically to be used with system 100 to enable a user, for example, to monitor the status: of system 100, of individual receptacles 110, and/or of individual customer orders, etc. In some embodiments, for example, user devices 118 could be utilized by employees working at individual workstations (see, for example, the description below related to workstation 160) at which receptacles 110 stop in order to be filled with one or more items. The employee could utilize user device 118 to inform system 100 when the designated task for that individual workstation has been completed so that system 100 could continue transporting a given receptacle 110 through the remainder of its path until all of the items designated for that given receptacle have been loaded therein and the given receptacle has been moved to the appropriate location for packaging and shipping of those items.

While system 100 may be configured to include hard-wired interconnections between individual electronic components, such as LIMs 106 and control module 120, more benefits may be obtained when network 114 is utilized for electronic communications, such as is illustrated in FIG. 1, where each LIM 106, sensor 112, data store 116, user device 118, and control module 120 are all coupled together via network 114. The connections to network 114 may be physical, such as via an Ethernet connection, or they may be wireless, such as via a Bluetooth and even cellular connection (and system 100 may include any combination of such connections, as appropriate). Materials handling system 100 is configured to transport portable receptacles 110 from at least one location to at least one other location through the application of electromagnetic forces that are established between LIMs 106 and a conductive portion of receptacles 110, such that the receptacles form part of the driving induction motor. In particular, LIMs 106, as briefly described above and shown in the figures, are essentially just a portion of the actual linear induction motor, while the conductive portion of receptacles 110 form the remaining portion of the linear induction motor. As is described in more detail below, the LIM 106 is used to create the magnetic field that interacts with the conductive portion of receptacles 110.

Control module 120 may include a variety of different modules, such as processor(s) 122, memory 124 (such as conventional random access memory "RAM"), data storage 126 (which may include storage such as hard drives, FLASH drives and the like), communications circuitry 128 (such as, for example, Ethernet, Bluetooth and cellular interface circuitry), sensor receiver modules 132 (which may include circuitry to monitor signals from one or more of sensors 112), and signal generation module 134 (which may, for example, include circuitry to generate signals to drive and control LIMs 106, such as pulse width modulation signals as will be described in more detail below).

Processor(s) 122 may include, for example, one or more individual microprocessors which can be configured to work independently or in conjunction with each other (such as in a distributed processing system), and the individual processors may be single-core or multi-core configurations. Processor(s) 122 can be coupled within control module 120 to each of memory 124 (which itself may include random access memory or "RAM", read only memory or "ROM," etc., which is used to store various portions of information for use by processor(s) 122), storage 126 (which may include conventional hard drives, FLASH memory devices, hybrid devices, cloud storage, etc., that can all be used to store programs, applications, data, etc. for use by processor (s) 122), communications module 128, sensor module 132 and signal generation module 134. Communications module 128 can include, for example, the necessary interface to control incoming and outgoing communications through Bluetooth devices, Wi-Fi connections, cellular phone service connections, etc., as well as providing the basic interface for Ethernet communications that can be used to connect control module 120 to network 114. Sensor module 132 can provide, for example, control signals that may be used to activate and monitor sensors 112 throughout system 100, and it may also be utilized to receive sensed signals and provide the received signals to processor(s) 122 such that processor(s) 122 may analyze the received signals and generate an accurate representation of the status of system 100. Signal generation module 134 may be coupled to processor(s) 122 such that processor(s) 122 can instruct signal generation module 134 what type of driving signals to generate for a specific LIM, and to provide the activation signals to signal generation module 134 that can cause the generated driving signals to be provided to a specific LIM 106.

System 100 also may include data store 116 that can be utilized for a variety of purposes, such as to store the status and location of individual customer orders, to send inventory requests to control module 120 that may then initiate the instructions to fulfill consumer orders, to store inventory control information such as bar codes for individual items, to store information regarding each individual portable receptacle in system 100, and other information as may be appropriate. Additional information that may be included in data store 116 can include properties or characteristics, such as approximate weights, of items that may be deposited within receptacles 110, individual information concerning LIMs 106, such as LIM identifiers and LIM locations, as well as the locations and processing capabilities of workstations within system 100.

Receiving surface 102 may be formed from a variety of materials. For example, surface 102 may be formed from aluminum (which may or may not be polished), stainless steel, or any number of other metals or plastics. Any of these materials may be selected in order to attempt to lower the surface friction between surface 102 and the portion of receptacle 110 that makes contact with surface 102 (various different configurations of receptacle 110 are described below, which persons skilled in the art will appreciate are intended to be illustrative and not limiting). In addition, these materials may be coated with any number of substances in order to further reduce the surface friction, such as a coating of Teflon or silicon-based material. In other embodiments, surface 102 may include a number of small holes that could be formed from drill or laser, through which compressed air may be applied to cause receptacles 110 to float through system 100 (using principles that are similar to those used in designing an air hockey table). In general, the lower the surface friction, the less force required to be generated by LIMs 106 in order to propel receptacles 106 along (and therefore, less energy is required to keep system 100 running).

Surface 102 may also, for example, be formed of non-continuous materials, such as a series of rollers which rotate in a highly efficient manner through the use of internal ball bearings. Moreover, surface 102 may be a wide-open, free-form surface, such that receptacles could be propelled in any direction based on the configuration of LIMs 106, or surface 102 may be combined with rails 104 (see FIG. 2 described below) to provide a higher degree of reliability that receptacles will travel along their intended path. The use of rails 104, however, may limit the different paths that receptacles 110 can be propelled (for example, as described in more detail below with respect to FIG. 8, if rails 104 are not utilized, receptacles 110 can be propelled along a direction Q such that the receptacles 110 cross path X). Moreover, while the figures show surface 102 as generally a solid surface, surface 102 may instead be formed as a pair of rails or individual surfaces on which the outer edges of receptacles 110 would travel (the rails, for example, could be formed from PVC tubes or other similar implementations). In that case, LIMs 106 could be mounted on individual, free-standing columns located in between the two portions that make up surface 102, such that there would be no surfaces, components or structures between LIM 106 and receptacle 110 as receptacle 110 passes over LIM 106. In these instances, the surface friction between surface 102 and receptacle 110 would be reduced simply because there would be fewer points of contact between them.

Figure 2:
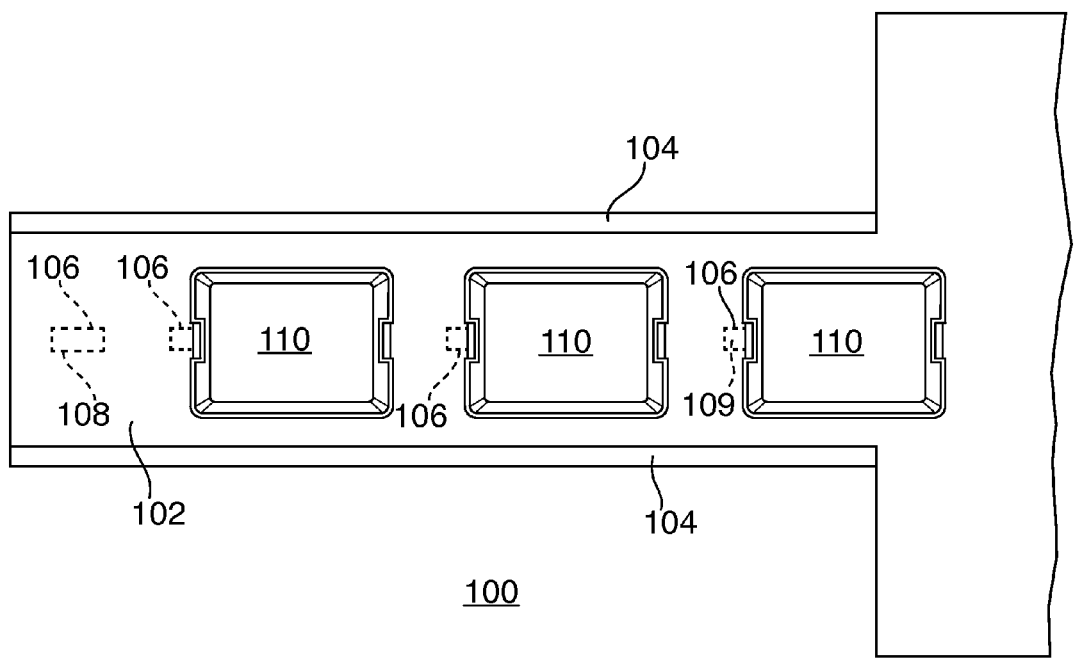
FIG. 2 shows a schematic top view of a linear induction motor-driven materials handling system in accordance with embodiments of the present disclosure.

FIG. 2 shows a schematic top view of a portion of materials handling system 100. As shown in FIG. 2, materials handling system 100 may include a receiving surface 102, one or more guides 104 and one or more LIMs 106 that are used to control the movement of portable receptacles 110 through system 100 from a first position to a second position, and subsequently to a third position, fourth position, and/or nth position as needed. For example, at a first position, a portable receptacle may receive a first item, and then be moved to a second position where the receptacle may receive a second item and/or have the first item removed.

Receiving surface 102 may correspond to a surface upon which the one or more portable receptacles 110 move (or, as described above, surface 102 may be implemented as a pair of rails or individual surfaces with LIMs 106 located between them). The various LIMs are operable to be located on receiving surface 102, embedded within receiving surface 102, positioned below receiving surface 102 (see, for example, FIGS. 5A-5C and the corresponding description below), and/or located between portions of surface 102. As described above, in some embodiments, receiving surface 102 is operable to reduce the surface friction between the one or more portable receptacles moving thereon, such as through the use of a coating of silicon-based material, to reduce surface friction (other materials, for example, may be similarly utilized to minimize the surface friction between receptacles 110 and surface 102). Various other mechanisms to reduce the amount of surface friction between receiving surface 102 and portable receptacles 110 may also include modifying the temperature of receiving surface 102. Persons of ordinary skill in the art will recognize that any other suitable technique may be used to lower the surface friction between receiving surface 102 and portable receptacles 110, and the aforementioned are merely exemplary.

Receiving surface 102, in some embodiments, can be substantially planar and continuous, however, other configurations are also disclosed herein. For example, receiving surface 102 may be wider at one position and thinner at another position (see, for example, FIG. 2). Further, receiving surface 102 may include one or more rails or tracks (for example, similar to train tracks), instead of a continuous, planar surface, upon which the receptacles 110 can move between locations of the system 100. Receiving surface 102 may also be curved, both in the direction of motion of portable receptacles 110 and/or perpendicular to the direction of motion. For example, a center portion of receiving surface 102 may be raised in relation to a side portion of receiving surface 102. Receiving surface 102 may also be oriented at any suitable angle with respect to gravity such that portable receptacles 110 are capable of being moved from a first height to a second height due to gravitational forces.

In some embodiments, materials handling system 100 may include one or more guides 104 that operate to keep receptacles 110 on receiving surface 102 while in motion. This may be especially useful in situations where malfunction of one or more LIMs can occur and portable receptacles 110 are unconstrained—protecting them from potentially falling off an edge of surface 102. Guides 104 may be short rails along the sides of surface 102 (see, for example, FIG. 6), or guides 104 may be complete side-sections of material (similar to the material that forms surface 102), such that there is virtually little chance of any of receptacles 110 falling off of surface 102 regardless of the circumstances. It should be noted that it may also be possible to design system 100 such that the interaction between LIMs 106 and receptacles 110 is so tightly coupled or controlled that guides 104 may not be necessary when the system is provided with electricity. For example, LIMs 106 may be located close together along a direction of movement of the receptacles 110 on the receiving surface 102, such that a moving receptacle 110 moves directly from one LIM 106 to another, with little to no free movement.

Accordingly, guides 104 may be designed in any suitable manner, depending on the application. For example, guides 104 may vary in height or shape along a length of receiving surface 104, such that they may be straight, curved or any combination thereof. For example, guides 104 may be at a first height at a first section of receiving surface 102 which may be straight, and at a second height at a second section of receiving surface 102, which itself may be curved. Thus, guides 104 may be substantially flat, curved, or any combination thereof.

In other embodiments, fewer LIMs may be utilized along a given portion of surface 102, such as through the use of only LIMs 108 and 109 as shown in FIG. 2 (LIMs 106, 108, and 109 may be substantially identical to each other). As shown in FIG. 2, LIMs 108 and 109 are spaced relatively farther apart from each other than any two adjacent LIMs 106 of the four LIMs 106. Alternatively, LIMs 106 (and/or LIMs 108, 109), may actually be installed in system 100, and any suitable operation may utilize each of LIMs 106 together or separately. For example, one particular operation may utilize only LIMs 108 and 109, other operations may utilize LIMs 106 and 108, and still other operations may utilize any combination of installed LIMs, such as LIMs 106, 108 and 109. In one embodiment, for example, when only LIMs 108 and 109 are utilized, the force applied to receptacles 110 may be such that a given receptacle 110 moves freely, or substantially freely, from LIM 108 to LIM 109. Under such circumstances, a given receptacle 110 may be provided enough propulsion from the force applied by LIM 108 to reach LIM 109, at which point LIM 109 may be capable of providing an additional force to receptacle 110 causing the receptacle to move to another position within materials handling system 100.

In some embodiments, a first LIM, such as LIM 108, may be capable of providing enough force to move multiple portable receptacles 110. For example, a first portable receptacle 110A, a second portable receptacle 110B and a third portable receptacle 110C may be positioned adjacent to one another on receiving surface 102 between two LIMs, such as LIMs 106A and 106C (see FIG. 7). A force applied to third portable receptacle 110C by LIM 106C is operable to move all three receptacles 110A, 110B, and 110C along receiving surface 102 toward LIM 106A, either electromagnetically or through a mechanical momentum transfer (e.g., elastic/inelastic collision). In this particular embodiment, multiple receptacles 110 are capable of being "pushed" along receiving surface 102 by a single LIM (e.g., LIM 106C), thereby further decreasing the amount of energy needed to operate materials handling system 100.

Materials handling system 100 as shown in FIG. 2 may be a partial representation of an actual materials handling system that may be utilized to move items selected and ordered by a consumer from one or more given storage locations to one or more packing locations in order to prepare the ordered items for shipment to the consumer. In addition, materials handling system 100 may also be utilized to move the packed items located in the shipment boxes to one or more additional locations from which shipments may depart the materials handling system 100.

Figure 3:
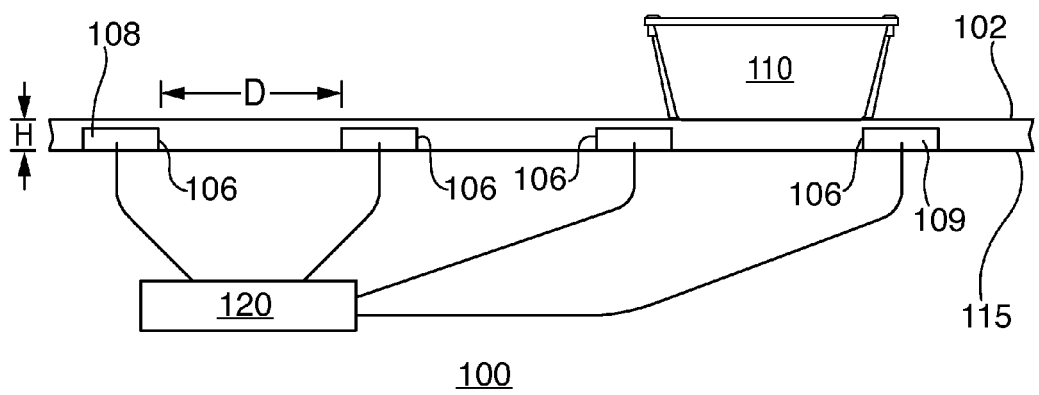
FIG. 3 shows a schematic side view of a linear induction motor-driven materials handling system in accordance with embodiments of the present disclosure.

FIG. 3 shows a schematic side view of materials handling system 100 which, as described above, includes receiving surface 102 and LIMs 106. As shown in FIG. 3, system 100 also includes lower surface 115 which may be located below receiving surface 102 by a given distance H. Distance H should be set such that LIMs 106 are close enough to surface 102 such that they will be able to interact with the conductive elements of receptacles 110 moving across surface 102. Lower surface 115 may be utilized for a variety of different reasons. In some embodiments, lower surface 115 may be implemented as a series of sliding drawers that provide easy access to LIMs 106 for maintenance and repair. Alternately, lower surface 115 might be implemented as a single sheet of material that is pre-populated with LIMs to simplify the fabrication process of system 100. LIMs 106 may be installed in various other manners, such as those described below and shown in FIGS. 5A-5D. As shown in FIG. 3, LIMs 106 may be located a common distance D apart from each other, or system 100 may be configured such that some LIMs 106 may be located a distance D apart from each other while others are either closer together or farther apart from each other depending on the desired results. For example, if surface 102 was configured as an incline, LIMs 106 may be located closer together so that the driving force from LIMs 106 is maintained as receptacles 110 move up the incline (see, for example, FIG. 9).

Figure 4:
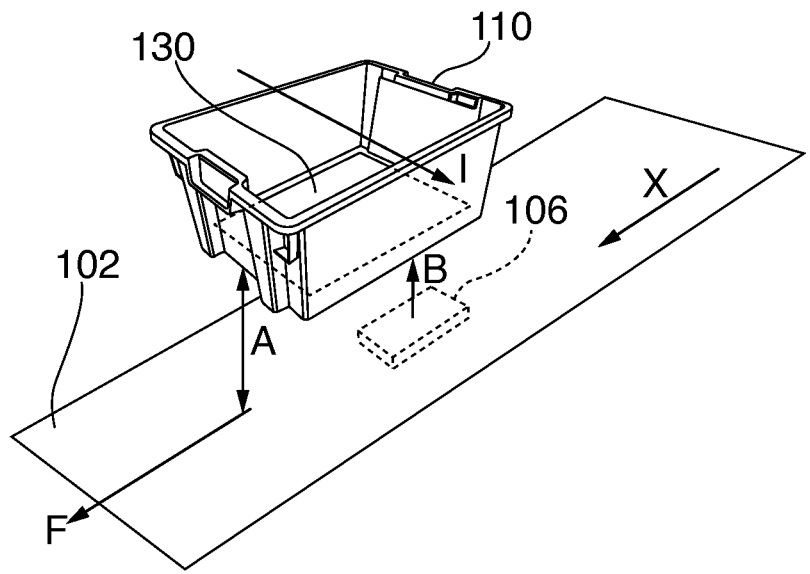
FIG. 4 shows a schematic perspective illustration of the interaction between the linear induction motor and the portable receptacle in accordance with embodiments of the present disclosure.

FIG. 4 is a three dimensional illustration that shows the basic principles that are utilized in accordance with embodiments of the disclosure herein. In at least one embodiment, each of LIMs 106 is controlled by control module 120, which is capable of sending one or more control signals (generated by signal generator 134) to any LIM within system 100. Those signals may include simple alternating currents (i.e., AC), or they may include more complicated signals, such as pulse-width modulated ("PWM") signals that can be used to provide more power to the LIMs in a more precisely controlled manner. Through the precise application of these signals, control module 120 is operable to keep receptacles 110 moving through materials handling system 100 in an orderly fashion in compliance with the operations of the materials handling system 100 (e.g., the ability to stop one or more receptacles 110, change the direction of motion of receptacles 110, etc.). While control module 120 is only shown being connected to LIMs 106 via network 114 in FIG. 1, persons skilled in the art will appreciate control module 120 is coupled to communicate with LIMs 106 via network 114 in each of the other figures as well. For example, each of LIMs 106 may be individually addressable via network communications from control module 120, which may select the appropriate LIMs to command based on information stored about the LIMs in data store 116. Moreover, the communications between LIMs 106, network 114 and control module 120 may be accomplished in a wide variety of ways, including any wired or wireless connections such as via Ethernet (typically a direct connection), Bluetooth and/or cellular service (typically accomplished via wireless connections). Alternately, LIMs 106 may be coupled to control module 120 via a direct, hard-wired connection.

Each of LIMs 106 operates in essentially the same manner regardless of which direction the electromagnetic force may be applied. When control module 120 sends a signal to a given LIM 106, a current is generated in coils or wires within LIM 106. The signal may be a simple AC signal, or it may be a more complex signal, such as a PWM signal, depending on the need. The generated current causes a magnetic field "B" to be generated perpendicular to receiving surface 102 (see FIG. 4). The generated magnetic field B then induces a current "I" in conductive element 130 that is a part of receptacle 110. Current I is generated parallel to surface 102, but in a direction that is perpendicular to the intended axis of travel of receptacles 110. The interaction between the generated magnetic field and the induced current, causes a force "F" to be applied to receptacle 110 that causes receptacle 110 to move in a direction "X." The applied force needs to be, at a minimum, greater than the surface friction between receiving surface 102 and receptacles 110 in order to move the receptacles. Accordingly, during system operations, based on all of the known information, such as the contents of each receptacle 110, the weight of the receptacle and contents, etc., control module 120 can generate varying signals to be applied to each individual LIM to dynamically control the movement, speed, stopping and starting of the LIMs as they travel throughout the materials handling system.

Persons skilled in the art will appreciate that, in accordance with the disclosures herein, the distance between receptacles 110 and LIMs 106, which is indicated by reference "A" in FIG. 4, is exaggerated for illustrative purposes only, and that the actual distance between LIMs 106 and receptacles 110 may be as small as a few millimeters in order to maximize the interaction between the generated field and the induced current. Persons skilled in the art will also appreciate that the interaction between LIMs 106 and conductive portion 130 may result in receptacles 110 being levitated at least a small portion above receiving surface 102. The levitation may vary based on a number of factors, such as, for example, the number and weights of items located within a given receptacle 110. Moreover, even if receptacle 110 is not actually levitated, it may be advantageous to apply the levitating force to reduce the surface friction between receiving surface 102 and receptacles 110, which may reduce the energy needed to move receptacles 110 throughout system 100.

Portable receptacles 110, with the conductive material incorporated therein, operate as what is traditionally one half of a standard linear induction motor (that portion is sometimes referred to as a carrier or forcer). The other half of the linear induction motor, which is indicated throughout the disclosure as LIMs 106, may include a series of magnets installed in alternating polarity (that portion is sometimes referred to as the magnetic rail or driver). The inclusion of conductive portion 130 within receptacles 110 results in receptacles 110 being a part of the induction motor itself. This provides improvements over conventional systems, such as the ability to energize only those portions of materials handling system 100 that are currently being used. For example, if system 100 were utilized to move a single receptacle 100 to three workstations in sequence for adding items from each work station, only the LIMs close to the current path of travel need be energized (for example, if the current path of travel caused receptacle 110 to travel over 10 LIMs 106, only the 2 or 3 LIMs closest to the actual, current location of receptacle 110 need be energized at any point in time). This may result in significant energy savings, as well as a significant reduction in moving parts that may require maintenance, create audible noise and generate dirt or dust within system 100.

Figure 5A:
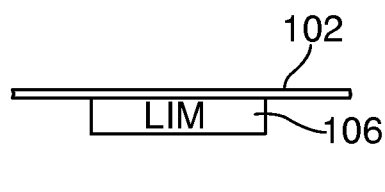
FIGS. 5A-5D show schematic side views of some alternate ways to mount the linear induction motor in accordance with embodiments of the present disclosure.
Figure 5B:
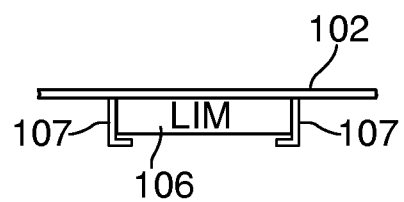
Figure 5C:
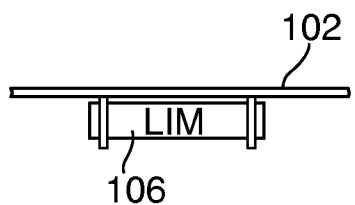
Figure 5D:
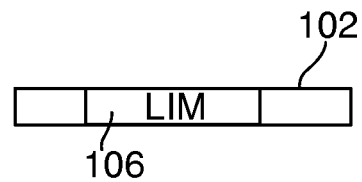

FIGS. 5A-5D show schematic side views of some alternate ways to mount LIMs 106 to surface 102 in accordance with embodiments of the present disclosure. In FIG. 5A, for example, LIM 106 is mounted directly to the underside portion of receiving surface 102. This implementation may provide LIMs 106 in close proximity to portable receptacles 110 as they pass by, but maintenance and repair may become difficult in view of the fact that LIMs 106 are essentially fixed in place. FIG. 5B, on the other hand, shows a pair of guide rails 107 that are mounted to the underside of receiving surface 102. In this example, LIMs 106 can be inserted between rails 107, which apply pressure to LIM 106 to keep it in place. This technique can simplify maintenance and repair, but installation may be time consuming as each LIM 106 would need to be installed individually. FIG. 5C shows an installation where a pair of small, U-shaped components or brackets are mounted to the underside of receiving surface 102 in order to retain LIMs 106 when they are installed therein. The installation shown in FIG. 5C provides similar advantages to the installation shown in FIG. 5B, however, it requires less material and provides access to more sides of LIMs 106. FIG. 5D shows yet another potential installation of LIMs 106. As shown in FIG. 5D, LIMs 106 may be incorporated at least partially or completely within receiving surface 102 itself, in which case receiving surface 102 may need to be implemented as something more than a single sheet of metal. Such an implementation could simplify construction and/or expansion of materials handling system 100, because LIMs 106 would already be located in place once receiving surface 102 had been installed. Alternatively, LIMs 106 may be mounted to an upper side of receiving surface 102 using any of the additional rails, components or brackets described above with reference to FIGS. 5A-5D, and the LIMs 106 may be at least partially or completely embedded within receiving surface 102 (e.g., partially embedded within channels or pockets from the upper side of receiving surface 102). In the case where LIMs 106 may at least partially protrude above the upper side of receiving surface 102, the lower surface of receptacles 110 may be configured to provide any additional required clearance (e.g., as shown in FIGS. 10J and 10K) to travel unimpeded over LIMs 106. Installation, maintenance and repair of LIMs 106 may be facilitated by mounting LIMs 106 to the upper side of receiving surface 102, depending on the accessibility and installed height of receiving surface 102 within system 100.

Figure 6:
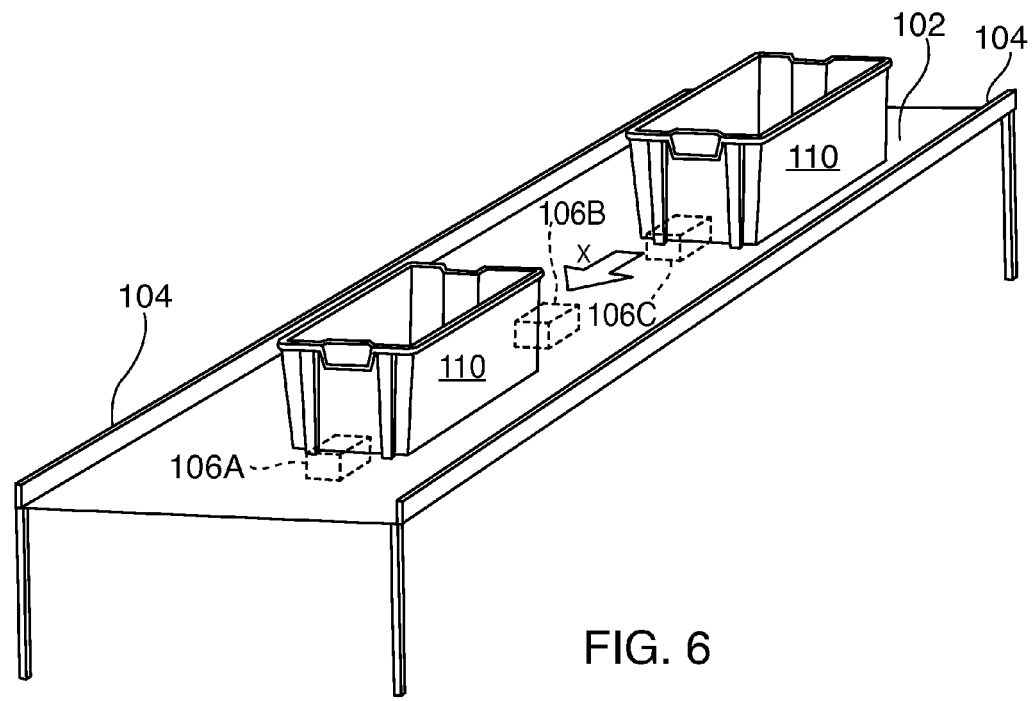
FIG. 6 shows a schematic perspective view of a linear induction motor-driven materials handling system in accordance with embodiments of the present disclosure.

FIG. 6 shows a schematic three dimensional perspective view of materials handling system 100, which includes receiving surface 102, guides 104, and LIMs 106. Portable receptacles 110 may move along receiving surface 102 in the "X" direction as a result of a force acting on portable receptacles 110. For example, a magnetic field B generated by LIM 106 perpendicular to the X direction of travel (as shown in FIG. 4), may generate a current I within conductive element 130 on a lower portion of portable receptacles 110, which, based on Ampere's Law, creates a force F on the conductive element 130 that causes receptacle 110 to move in the X direction. That force operates to move receptacle 110, for example, from LIM 106C to LIM 106B, which then creates its own force F that continues the movement of receptacle 110. Once receptacle 110 has moved within the magnetic field B generated by LIM 106A, a current is again generated in conductive portion 130 of receptacle 110, which creates a force F that continues the movement of receptacle 110 along direction X.

Figure 7:
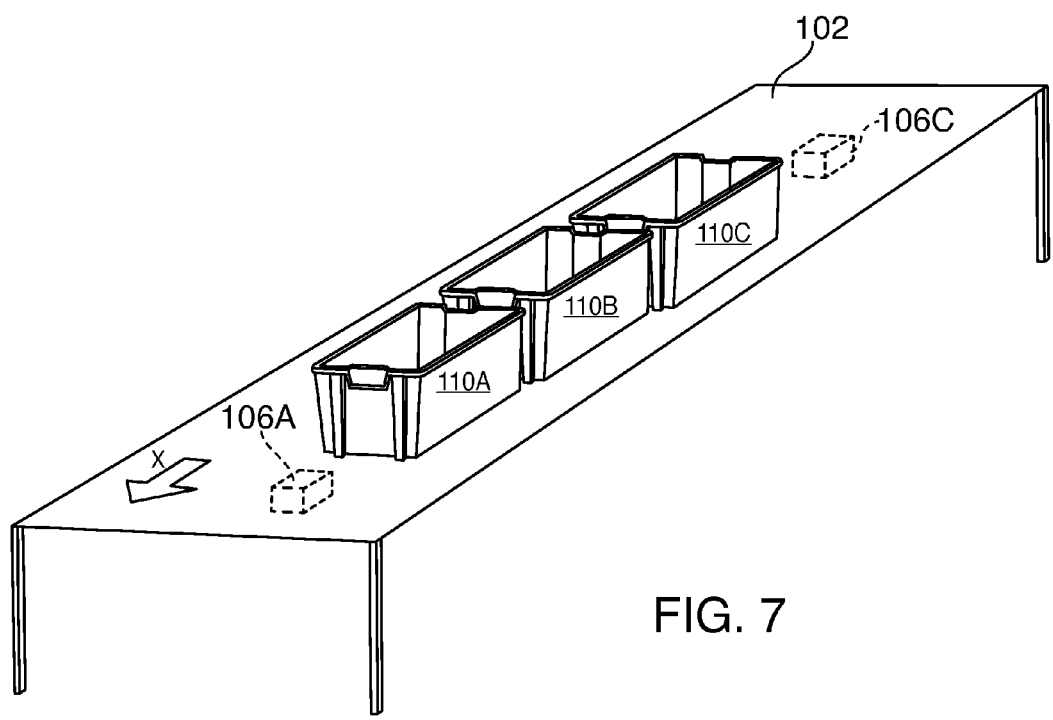
FIG. 7 shows a schematic perspective view of a linear induction motor-driven materials handling system in which multiple receptacles are driven by an individual linear induction motor in accordance with embodiments of the present disclosure.

FIG. 7 shows a schematic three dimensional perspective view of materials handling system 100 in which embodiments are disclosed where a generated force F applied to a single receptacle causes multiple receptacles 110 to move along the X direction on receiving surface 102. For purposes of illustration, LIMs 106 in FIG. 7 are labeled individually as LIMs 106A and 106C, and receptacles 110 are labeled individually as receptacles 110A, 110B, and 100C. As receptacle 110C moves in proximity to LIM 106C, LIM 106C may be activated by control module 120 described herein such that a magnetic field B is generated by LIM 106C in substantially the same direction as previously described (see FIG. 4), which generates a current I in conductive portion 130 of receptacle 110C that causes a force F to be generated at receptacle 110C, moving receptacle 110C past LIM 106C. In this instance, the signals generated by control module 120 should create enough force such that all of receptacles 110A, 110B and 110C are driven in the X direction from a single applied force to receptacle 110C. Alternatively, receptacles 110A, 110B, and 110C may have enough kinetic energy when approaching LIM 106C such that they may continue to move along the X direction all the way to LIM 106A without LIM 106C applying any additional force on receptacle 110 (this depends, for example, on many factors such as the location and spacing of LIMs 106 from each other and/or the configuration or elevations of receiving surface 102). Persons of ordinary skill in the art will recognize that LIM 106C, in one exemplary embodiment, may generate a magnetic field B in a direction different than the magnetic field generated by LIM 106A, which may modify the direction and/or speed of movement of the portable receptacle 110.

Once receptacle 110 begins to move across LIM 106C, the counter electromotive force, or back EMF, generated by receptacle 110 can be utilized to identify the location of receptacle 110 to control module 120 (which, in turn, may provide that information to data store 116 or storage 126). Back EMF, for example, occurs due to the electromagnetic field induced by conductive element 130 passing by LIM 106C. The back EMF is measurable at any point along receiving surface 102, and in particular, at each of LIMs 106. The back EMF may, in some embodiments, be used as a means to detect when each receptacle 110 reaches a specific LIM 106. As another example, the back EMF may be used to determine the current approximate weight of each portable receptacle 110 based on the strength of the magnetic field generated by the corresponding LIM 106, and the inherent impedance of the LIM 106. However, in some embodiments, one or more additional sensors (for example, see FIG. 1, and as described below with respect to FIG. 10E) may be included within materials handling system 100 that can be coupled to control module 120 via network 114 to detect when a specific receptacle reaches a specific position within system 100, as well as, or in addition to, the weight or content type of one or more items within a given receptacle 110.

Control module 120 may further cause LIM 106C to generate a magnetic field B that provides a force F that acts on receptacle 110 that may cause receptacle 110 to continue moving along the X direction toward a subsequent LIM 106. This process may be repeated any number of times to move receptacle 110 along receiving surface 102. Furthermore, as illustrated in FIG. 6, each individual receptacle 110 can be individually manipulated through handling system 100. Persons of skill in the art will appreciate that receptacles 110 may be moved along the X direction in different manners than described above. For example, receptacles 110 may be moved by LIM 106C directly to LIM 106A, such that LIM 106B is not activated at all. In that instance, for example, LIM 106B may be utilized as a back-up LIM providing redundancy in the event that LIM 106A or LIM 106C fails to operate in the intended manner. Alternatively, receiving surface 102 may include more than one axis of travel and LIM 106B might be utilized to change the direction of receptacle 110 from traveling along the X direction to another direction (see, for example, FIG. 8 below).

Figure 8:
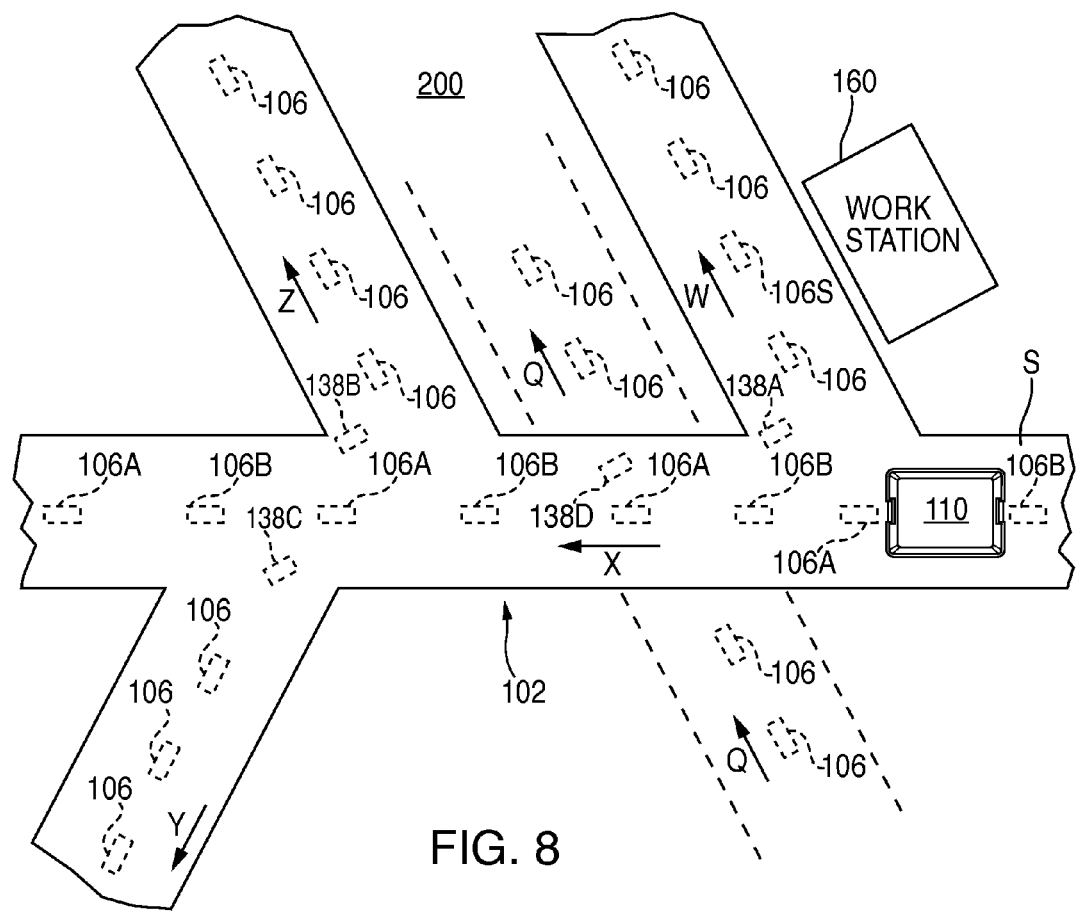
FIG. 8. shows a schematic top view of a linear induction motor-driven materials handling system in which portable receptacles are moved to any one of multiple locations in accordance with embodiments of the present disclosure.

FIG. 8 shows a schematic top view of a materials handling system 200 that may include receiving surface 102 (which, as described above, may include one or more low-friction surfaces), LIMs 106 aligned along multiple directions or axes W, X, Y and Z, and direction switches 138 that may be utilized to change the direction of a receptacle 110, initially traveling along one direction, to move along another different direction, such as when a receptacle is traveling in the X direction and is moved to one of direction W, direction Y or direction Z. For purposes of illustration, switches 138 are labeled as switch 138A, switch 138B and switch 138C, which are operable to cause the direction of travel of receptacles 110 to change. In some embodiments, switches 138 may be implemented as additional LIMs that change the direction of a portable receptacle through the use of applied magnetic forces. In other embodiments, switches 138 may be implemented as mechanical arms that can be controlled or actuated by signals from control module 120. Moreover, not all of the LIMs 106 shown in FIG. 8 may be required for normal operations. For example, the LIMs along the X direction are labeled alternately as LIM 106A and LIM 106B such that receptacles 110 may be driven by LIMs 106A, while LIMs 106B are utilized as redundant backup LIMs in the event of failure of one or more of LIMs 106A. Each of LIMs 106, 106A and 106B is coupled to control module 120, such that control module 120 can provide operational commands to each of LIMs 106 in system 200.

Materials handling system 200, like materials handling system 100 described above, is in most instances just a portion of a much larger inventory management system that can be utilized to collect and transport individual items. Accordingly, persons skilled in the art will appreciate that a complete materials handling system might include one or more instances of systems 100 and 200 (or other configurations that are not shown). Materials handling system 200 can direct portable receptacles along the X direction, or from the X direction to the W direction, the Y direction or the Z direction, depending on the desired destination. For example, receptacle 110 (shown in FIG. 8) can be moving along the X direction from a given LIM 106 to another LIM 106. Control module 120, in one embodiment, may send a generated signal to LIM 138A that causes LIM 138A to generate a magnetic field B that provides a force F that can act on conductive portion 130 of receptacle 110 to cause receptacle 110 to change direction from the X direction in which the receptacle is traveling to the W direction, where it may be picked up by one or more of LIMs 106 that are located along the W direction. Similarly, LIM 138B may be utilized to generate a magnetic field B such that a force F acts on receptacle 110 causing receptacle 110 to change direction from the X direction to the Z direction; LIM 138C can similarly cause receptacle 110 to change direction from the X direction to the Y direction; and LIM 138D can cause receptacle 110 to change direction from the X direction to the Q direction.

While FIG. 8 shows a more complex implementation of a materials handling system 200, it should be noted that such systems, utilizing the principles described herein, can be configured such that receptacles 110 may enter and exit the system from a variety of locations. For example, a path along the Q direction may be utilized such that receptacles 110 traveling along the Q direction travel directly across surface 102 through the area by which other receptacles are traveling in the X direction. System 200 may be capable of implementing this feature because the system is inherently deterministic, such that the location of virtually every receptacle 110 is known to control module 120. Accordingly, control module 120 could stop a given receptacle 110 traveling along direction Q prior to the intersection with direction X while waiting for traffic of receptacles traveling in the X direction to clear. Once an opening is identified, control module 120 could send the appropriate signal to LIMs 106 along direction Q to cause the stopped receptacle 110 to again move and now travel across the portion of the system normally traveled by receptacles 110 moving in the X direction.

FIG. 8 also shows an illustrative work station 160, which is intended as an example of the countless work stations that exist within materials handling systems 100 and 200. Work stations 160 may include, for example, work stations where empty receptacles are loaded onto or removed from receiving surface 102, work stations where items are loaded into or removed from receptacles 110 for storage in system 100, work stations where items are removed from inventory and loaded into or removed from receptacles 110 for shipment to consumers, work stations where shipping materials are stored for preparation of shipments, work stations where items and/or receptacles 110 are subject to quality checks or maintenance, etc. Work stations 160 may be utilized, for example, as follows. A given portable receptacle 110 enters the portion of system 200 shown at location "S" traveling along direction X. Switch 138A (e.g., mechanical switch or LIM switch) is activated by control module 120 which causes given receptacle 110 to be redirected from traveling in direction X to travel in direction W. When the receptacle arrives in the vicinity of LIM 106S, control module 120 issues a stop signal to LIM 106S that causes the receptacle to stop in front of work station 160 (LIMs 106 may be implemented, for example, such that an applied magnetic field can be used to stop a receptacle 110 or move it forward or backward). At work station 160, for example, one or more consumer-selected items may be loaded into receptacle 110, or any other processing may be performed with respect to items or the receptacle 110. This can be accomplished through a human interface, whereby an individual places the item(s) in receptacle 110 and indicates to control module 120, e.g., via user device 118, that the task is complete; or via a robotic interface, in which case control module 120 would receive a signal from the robotic interface when loading was complete. Once loading was complete, control module can provide an activation signal to LIM 106S that would cause the receptacle to again begin traveling along direction W to its next destination (which may, for example, be a different work station 160). Eventually, for example, that same receptacle might return to traveling along direction X until the order preparation is complete and the order is sent off for shipping.

Figure 9:
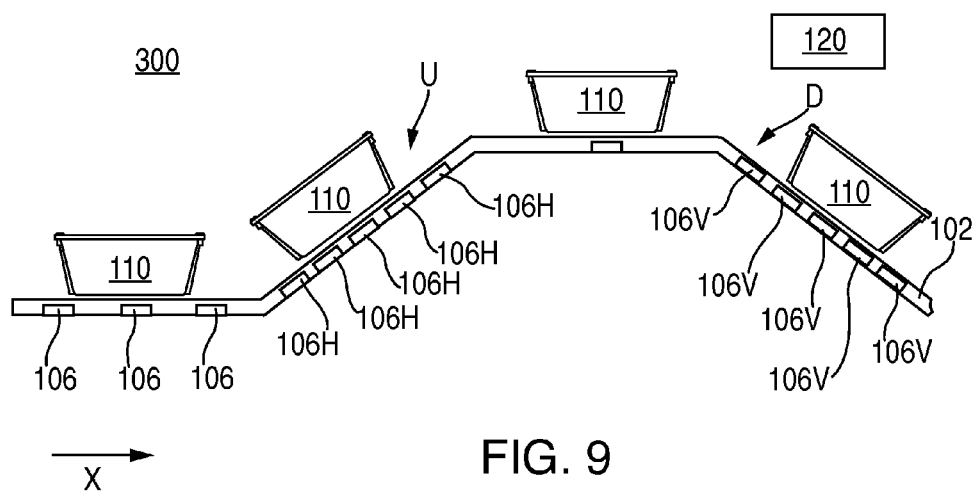
FIG. 9 shows a schematic side view of a linear induction motor-driven materials handling system in which portable receptacles are transported through various elevations in accordance with embodiments of the present disclosure.

FIG. 9 shows a schematic side view of a materials handling system 300 which is similar to previously described systems 100 and 200, except that system 300 includes portions of the receiving surface 102 having various elevations, e.g., a portion that goes up an incline U and a portion that goes down a decline D. System 300 includes a receiving surface 102 within which LIMs 106 are mounted (in the manner previously shown and described with respect to FIG. 5D). Receptacles 110 move along direction X, propelled by electromagnetic force from LIMs 106. In this case, the spacing between LIMs 106 varies depending on where LIMs are located. For example, LIMs 106 that are located on the incline portion U of the system 300 are labeled as LIMs 106H, and may be spaced closer together to insure that control is maintained over receptacle 110 (but such close spacing is not required). Similarly, LIMs 106V are located on the decline portion D of the system 300 with closer spacing to again maintain control of receptacle 110 as it travels along direction X (similarly, such closer spacing may not be required).

As portable receptacles 110 move up incline U and down incline D, control module 120 may vary the signals applied to LIMs 106H and 106V to account for the variations in speed caused by the change in varying elevation and gravitational forces. Moreover, because feedback of traveling speeds can be provided to control module 120 in an essentially instantaneous manner through the use of back EMF, control module 120 can generate varying control signals such that the speed of receptacles 110 is maintained in a relatively constant manner (if that is the desired result).

Figure 10A:
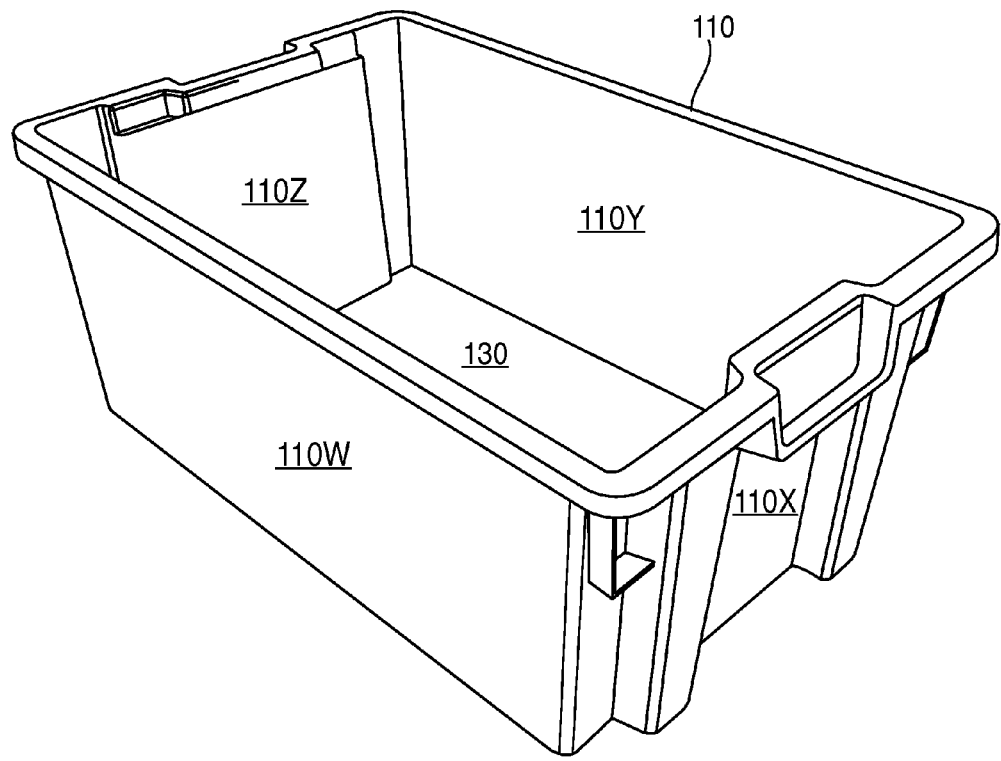
FIG. 10A shows a schematic perspective view of a portable receptacle constructed in accordance with embodiments of the present disclosure.

FIG. 10A shows a schematic three dimensional perspective view of a representative portable receptacle 110, including side walls or portions 110W, 110X, 110Y, and 110Z, a base portion 110V which has conductive element 130 attached to or integrated therein (for example, in FIG. 10A, conductive element 130 is shown to be covering base portion 110V). The conductive element may, in some embodiments, correspond to a strip or piece of copper, iron, silver, aluminum, or any other conductive material, or any combination thereof. Or the conductive element may be formed from material that is doped with conductive particles (e.g., copper, iron, silver, etc.) into the non-conductive materials used to form the base portion or side walls or portions of the receptacle. Further, the conductive element may be placed on any surface of base portion 110V, or at least partially or completely embedded within base portion 110V, or the conductive element may be placed in any surface of receptacle 110 (for example, the left and/or right side walls of receptacles 110 may include a conductive element in which case LIMs 106 could be mounted on stand-alone poles above and/or along the sides of surface 102 such that the conductive elements pass by proximate to the LIMs 106). It can be beneficial for portable receptacle to be as light-weight as possible, as this will reduce the energy required to move receptacles throughout the materials handling system. In order for receptacles 110 to be able to interact with LIMs 106, at least a portion of receptacle 110 needs to be conductive. Accordingly, the receptacle 110 shown in FIG. 10A includes non-conductive side walls or portions 110W, 110X, 110Y and 110Z, while base portion 110V (which is underneath conductive element 130 in FIG. 10A) of receptacle 110 includes conductive element or insert 130 that can interact with LIMs 106. While receptacle 110 shown in FIG. 10A is rectangular in shape, one of ordinary skill in the art will appreciate that a receptacle may have other shapes, such as the round shapes shown in FIG. 11, other polygonal shapes or any other shapes configured to receive items therein.

The actual implementation of inclusion of a conductive portion into receptacles 110 can vary greatly within the spirit of the disclosure. For example, FIGS. 10B-10F show various illustrative schematic top views of alternate configurations of conductive element 130 within the base portion of portable receptacle 110. Persons of ordinary skill in the art will recognize that these are merely exemplary illustrations and that there are a multitude of different configurations to which the teachings of the disclosure herein can be applied. For example, conductive elements 130 may themselves be of any suitable size and/or shape, provided that there is enough conductive material to interact with the magnetic field B generated by LIMs 106. Furthermore, as mentioned above, the composition of conductive elements 130 may vary from a single conductive material, to a compound of multiple conductive materials, to mixtures of non-conductive and conductive materials. For example, the conductive materials may include an array or grid of coils that are aligned such that an applied magnetic field would cause receptacle 110 to move at a right angle down a different path than the path on which it would otherwise travel. In that case, the change in direction may be less than ninety degrees due to the forward momentum that would also need to be overcome when the field was applied.

Figure 10B:
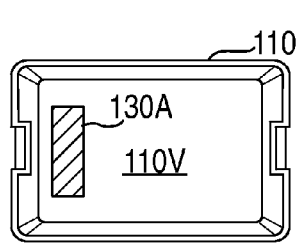
FIGS. 10B-10G show schematic views of a portion of a portable receptacle constructed in accordance with embodiments of the present disclosure.

In FIG. 10B, conductive element 130A is located in base portion 110V of receptacle 110 such that it can pass directly over any one of LIMs 106 which are aligned along the intended path of travel of receptacles 110. In general, the size and orientation of conductive element 130 can be configured such that any of LIMs 106 can affect the trajectory and speed of receptacle 110, as described above. Although conductive element or insert 130A is located at a first position along base portion 110V, in some embodiments, conductive element 130A may be positioned along any other position along base portion 110V, such as proximate side walls or portions 110W, 110X, 110Y, or 110Z, and/or in a center of base portion 110V.

Figure 10C:
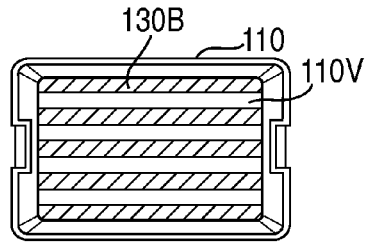

FIG. 10C shows an alternate arrangement in which conductive strips of material 130B are embedded within base portion 110V. For example, conductive strips 130B may form a criss-cross pattern along the base portion of receptacle 110, a checker board pattern, any other pattern, or any combination thereof (only a stripe pattern is shown). In some embodiments, conductive strips 130B may be on an outer surface of base portion 110V, however, at least a portion of conductive strips 130B may be embedded within a non-conductive material forming base portion 110V.

Figure 10D:
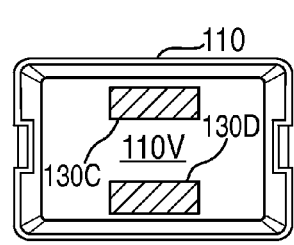

FIG. 10D shows another alternate configuration of conductive elements or inserts 130 applied to receptacle 110, in which two conductive elements 130C and 130D are applied to or within base portion 110V. For example, conductive elements 130C and 130D may be attached to base portion 110V, but located close to either side wall or portion (e.g., 110W & 110Y or 110X & 110Y) of base portion 110V. In some embodiments, conductive elements 130C and 130D can be embedded within base portion 110V, which may be formed of a non-conductive material (e.g., similar to the non-conductive material used to form side walls or portions 110W-Z).

In other configurations, conductive elements 130C and 130D can be oriented such that additional control of receptacle 110 may be accomplished by utilizing LIMs 106 configured to be aligned with elements 130C and 130D. For example, receiving surface 102 may include a first LIM oriented in a first direction and a second LIM oriented in a second direction. When portable receptacle passes across the first LIM, conductive element 130C may interact with the first LIM such that portable receptacle 110 moves in a first direction. When portable receptacle passes across the second LIM, however, conductive element 130D may interact with the second LIM, thereby causing portable receptacle 110 to move in a second direction. In this particular scenario, a single portable receptacle 110 is capable of moving in any number of directions based on the orientation of the LIMs located on receiving surface 102 of materials handling system 100.

Figure 10E:
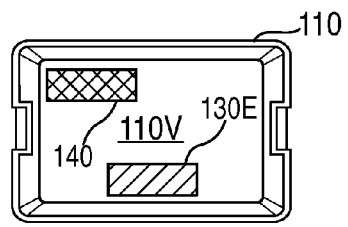

FIG. 10E shows yet another configuration of base portion 110V. In this case, a conductive element 130E is applied to, or embedded in, base portion 110V, as well as an additional item, such as an identifier, tag or other sensed element 140. Sensed element 140 may, in some embodiments, be used to monitor the location of receptacle 110 as it travels about materials handling system 100, 200 and/or 300. Sensed element 140 may be any type of identifier or tag including, but not limited to, a Radio Frequency Identification ("RFID") tag, a bar code, a QR code, an alphanumeric identifier, or other identifier. Sensor 112 of FIG. 1, for example, may, in one embodiment, read, scan, image or otherwise identify sensed element 140 in order to detect portable receptacle 110 and/or one or more items stored therein. In response to detecting sensed element 140, sensor 112 may send a signal to sensor module 132 of control module 120 to cross check whether or not portable receptacle 110 is moving in a correct direction (e.g., to a correct end point) and/or if portable receptacle includes the correct items therein, for example, by reference to information stored in data store 116 or storage 126.

Figure 10F:
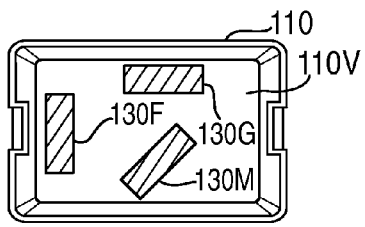

FIG. 10F, on the other hand, shows a configuration in which three different conductive elements 130F, 130G, and 130M are included within base portion 110V in order to provide more precise control of receptacle 110. For example, conductive portion 130F may be utilized to move receptacle 110 along a first direction, conductive portion 130G may be utilized to move receptacle 110 along a second direction, and conductive portion 130M may be utilized in changing direction of receptacle 110.

Figure 10G:
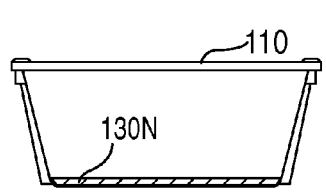

FIG. 10G shows a schematic cross-sectional view of receptacle 110. For example, FIG. 10G shows that conductive material 130N has been impregnated into base portion 110V, e.g., by doping the material of the base portion with conductive material during manufacturing of receptacle 110 (in FIG. 10G, base portion 110V and conductive element 130N are, in essence, one in the same and only reference numeral 130N is shown). In that instance, the use of conductive material might not be apparent to an observer or an employee handling the receptacle 110. Base portion 110V, in this particular scenario, may be formed of a non-conductive material, such as plastic or cardboard, that has conductive elements impregnated therein such that base portion 110V retains the quality and appearance of a non-conductive material, similar to side walls or portions 110W-Z, but includes the appropriate conductive features for interacting with various LIMs 106.

Figure 10H:
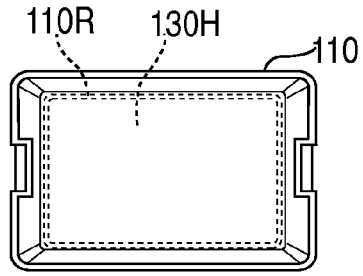
FIGS. 10H-10K show alternate physical configurations of a portable receptacle that provides a reduced lower surface area in contact with a linear induction motor-driven materials handling system constructed in accordance with embodiments of the present disclosure.
Figure 10I:
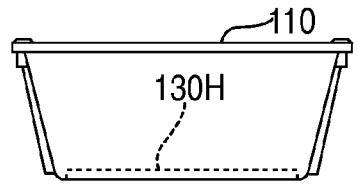
Figure 10J:
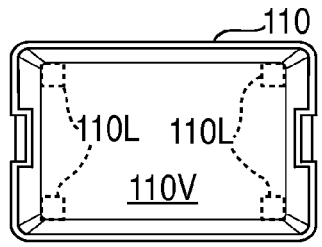
Figure 10K:
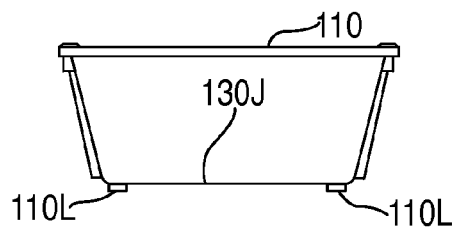

FIGS. 10H-10K show alternate physical configurations of receptacle 110 which are intended to provide a reduced surface area that would be in contact with surface 102, to reduce the surface friction between those surfaces. FIG. 10H, for example, shows a schematic top view of receptacle 110 including conductive element 130H. FIG. 10I shows a schematic side view of the receptacle shown in FIG. 10H, in which only a small portion of the outer edge of receptacle 110 extends fully to a lower surface that contacts surface 102. More particularly, only the outer rim 110R of the base portion extends fully to the bottom of receptacle 110, while conductive element 130H is raised slightly so that it is not in contact with surface 102 while receptacle 110 is being transported within materials handling system 100, 200, and/or 300. Similarly, FIGS. 10J and 10K show another configuration for base portion 110V in which only legs 110L of base portion 110V extend down onto surface 102 while receptacle 110 is being transported within system 100, 200, and/or 300, further reducing the surface friction between surface 102 and receptacle 110. In this configuration, only a very small portion of receptacle 110 is ever in physical contact with receiving surface 102; accordingly, the surface friction that needs to be overcome for inducing movement of an empty receptacle may be significantly reduced as compared to a receptacle with a continuous planar bottom surface. Moreover, the conductive element 130J is shown as a general representation in FIG. 10K and can, for example, be configured in at least any manner previously described with respect to FIGS. 10A-10G. It also may be beneficial to utilize wheels or rollers in place of legs 110L to further reduce the surface friction between surface 102 and receptacle 110. In such an implementation, surface 102 and receptacle 110 may be designed such that the wheels or rollers 110L could fit within a portion of surface 102 to help guide receptacle 110 to the proper location.

Figure 11A:
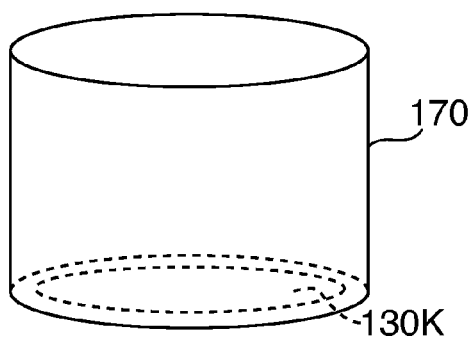
FIGS. 11A-11B show schematic views of a portable receptacle constructed in accordance with embodiments of the present disclosure.
Figure 11B:
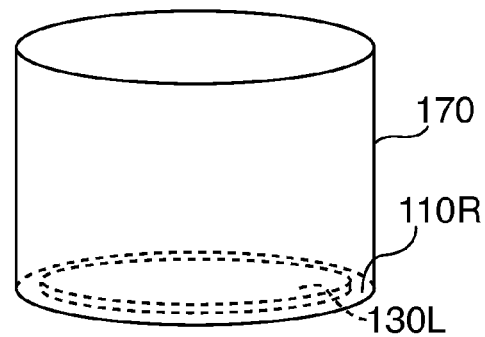

FIGS. 11A and 11B show three dimensional schematic views of receptacle 170, which is substantially similar to receptacle 100, except that it is shaped in a cylindrical manner instead of a rectangular shape. Moreover, persons of ordinary skill in the art will appreciate that a variety of other shapes, such as other polygons or any other shapes configured to receive items therein, may also be utilized as portable receptacles in accordance with the present disclosure. In particular, FIG. 11A shows a configuration of receptacle 170 in which conductive element 130K is located within base portion 110V of receptacle 170 such that it may be in contact with receiving surface 102 while receptacle 170 moves along material handling system 100, 200, and/or 300 (in FIG. 11A, base portion 110V and conductive element 130K are shown in the same manner as base portion 110V and conductive element 130J described above). FIG. 11B, on the other hand, shows an alternate version of receptacle 170 in which conductive element 130L is raised above the bottom of base portion 110R, similar to that shown in FIGS. 10H and 10I, to reduce surface friction.

Figure 12:
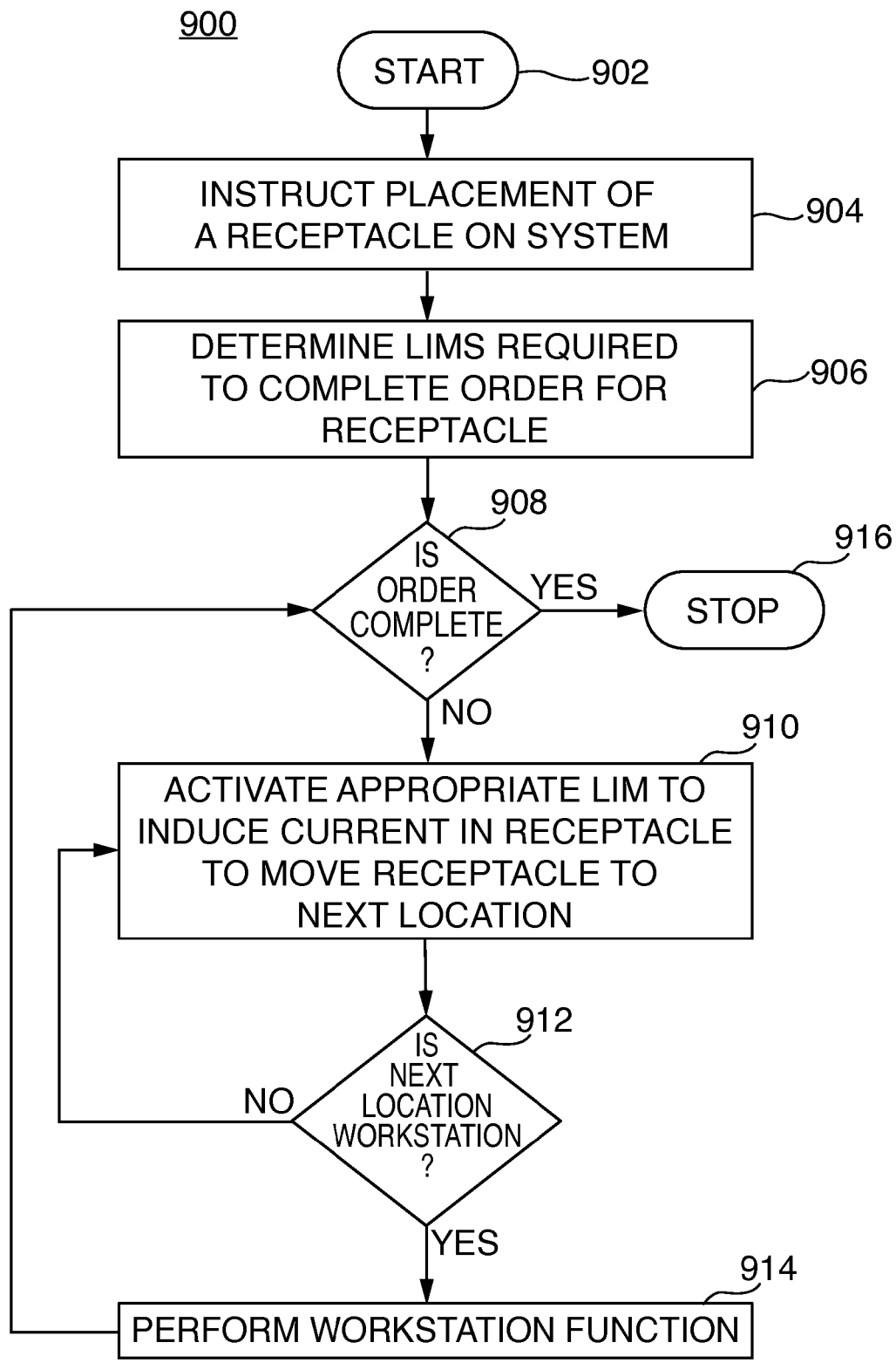
FIG. 12 is a flow diagram of a method of fulfilling an order utilizing a materials handling system in accordance with embodiments of the present disclosure.

FIG. 12 shows a flow diagram of a method 900 for fulfilling an order utilizing a portable receptacle that is at least partially conductive within a materials handling system in accordance with the disclosure herein. In this regard, it may be helpful to also review FIG. 1 and the accompanying description above, particularly with regard to control module 120 and the modules contained there. The method starts at step 902. In step 904, an instruction is given, for example by control module 120, to direct that a receptacle be placed at a given location within the materials handling system (that instruction may be carried out by an employee or by an automated part of the system that could place a receptacle 110 on to an entry point on receiving surface 102). In step 906, an analysis is performed to determine the path the placed receptacle needs to travel to complete the order for that receptacle, including determining which LIMs will be required to propel the receptacle around the materials handling system. This analysis may be performed, for example, by control module 120.

In step 908, a query is made to determine whether the order is complete for the corresponding receptacle (this query could be made, for example, by processor(s) 122 within control module 120 of a user device 118 which is being operated by an employee; alternatively, the status of a given order being processed may be stored in memory 124 and accessed by processor(s) 122 in order to complete the inquiry). If the order is not complete, in a step 910, the appropriate LIM is sent a signal (by signal generating module 134, which may be in response to an activation signal from processor(s) 122), which activates the LIM to generate a magnetic field B, which induces a current I in the conductive portion of the receptacle and creates a force F that moves the receptacle to the "next location." Next, in a step 912 another query is made to determine whether the "next location" at which the receptacle arrived is a workstation, other processing area or a final destination (this query could be made by processor(s) 122, for example, by seeking the status of one or more sensors 112 via sensor module 132). If the "next location" is not a work station, other processing area or the final destination, it is assumed that the receptacle is at an intermediate LIM and that the receptacle needs to be again transported to the "next location," so control returns to step 910.

Once a work station, other processing area or the final destination is reached and the query at step 912 is true, the task at the work station, other processing area or the final destination is performed in step 914. This task or function may include placing one or more items in the receptacle (which may occur manually, through a robot or a combination thereof). This task also may include placing packaging materials in the receptacle, and/or it may include removing the contents of the receptacle, placing the contents in a shipping container and then placing the packaged items back in the receptacle for transportation to the shipping work station (there can be a variety of tasks performed at work stations, other processing area or the final destination, only some of which have been described herein—persons skilled in the art will appreciate that the individual workstation and processing tasks described are not intended to limit the disclosure or claims in any way). Once the work station or processing task has been performed, control is returned to the query at step 908 where processor(s) 122 can determine whether the order is complete. If it is not yet complete, control is returned to step 910 to start the process of moving the receptacle to the next work station (in which case processor(s) 122 would continue to send signals to signal generation module 134 to cause module 134 to generate and send drive signals to specific LIMs 106), other processing area or the final destination as previously described. If the order is complete and the receptacle has arrived at the final destination, control stops in step 916.

Figure 13:
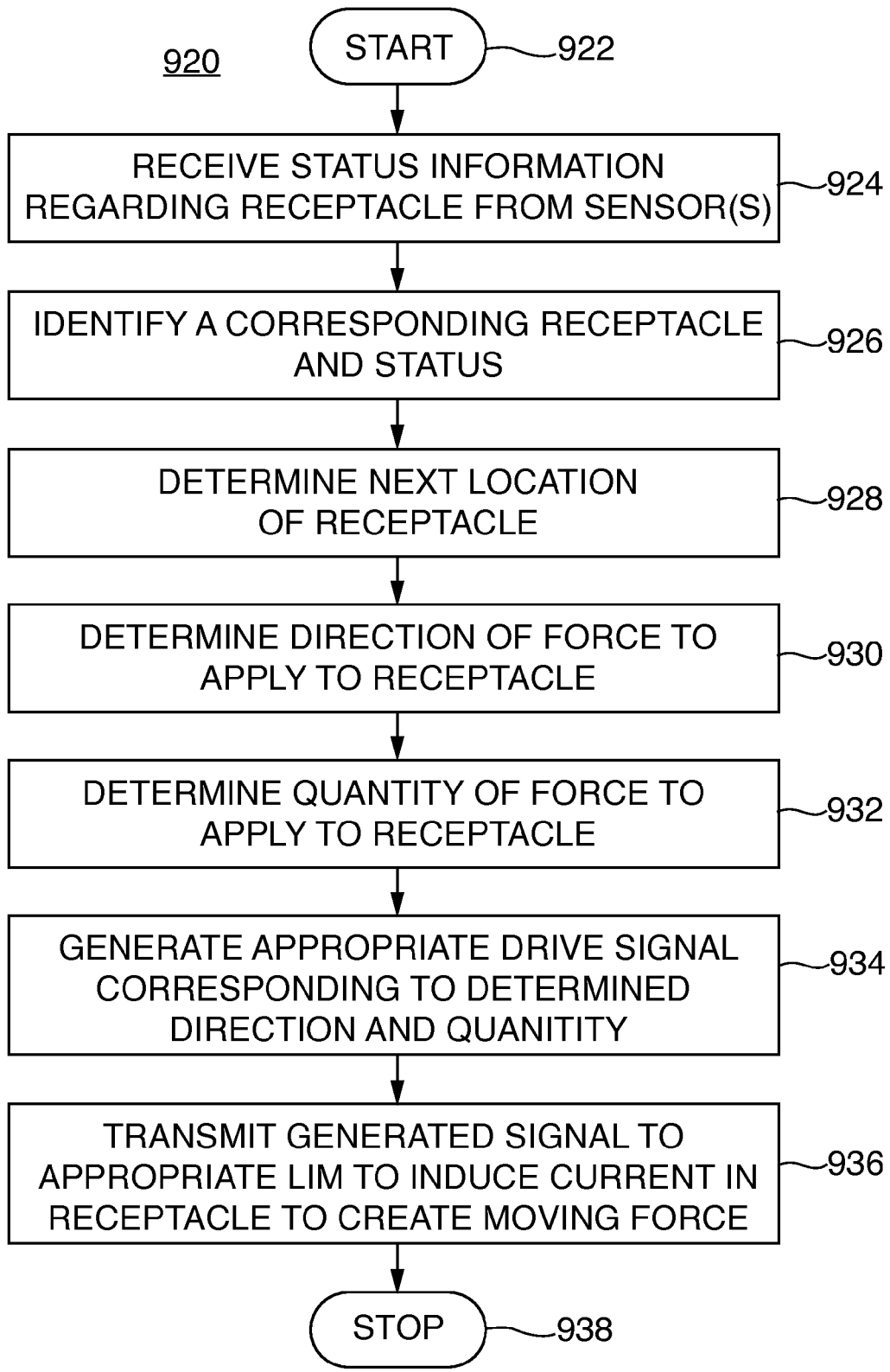
FIG. 13 is a flow diagram of a method of moving a portable receptacle to its next location in accordance with embodiments of the present disclosure.

FIG. 13 shows a flow diagram of a method 920 for controlling the movement of a portable receptacle that is at least partially conductive within a materials handling system in accordance with the disclosure herein. Method 920, which starts at step 922, may be carried out, for example, by control module 120, which was described in detail above with respect to FIG. 1 (as such, it may be helpful to refer back to the description of FIG. 1, and in particular, to the description set forth in connection with control module 120 and the modules contained there). In step 924, status information is received regarding an individual receptacle from one or more sensors (this may include, for example, utilizing sensor module 132 to gather information from one or more of sensors 112, and for sensor module 132 to send that gathered information to processor(s) 122). This information can relate to any of a number of different things, such as the identification of the individual receptacle, the location of the receptacle, the status of completion of the order intended for that receptacle, the current contents of the receptacle, the overall weight of the receptacle with the contents therein, etc. This information can be provided by one or more sensors which may include RFID readers, sensors to measure back EMF signals from one or more of the LIMs, imaging sensors, scanners, or other sensor devices.

Once the information has been obtained, in a step 926, the individual receptacle and corresponding information are matched together and the physical receptacle and corresponding nearby LIM are identified and located within the materials handling system (this step can be carried out, for example, by processor(s) 122, which may store such information about each active receptacle in memory 124 and/or storage 126, and which could then update the stored information based on the received status information). Then, in a step 928, the "next location" to which the individual receptacle is to travel is identified (this step could also be carried out by processor(s) 122). This "next location" may be a work station, other processing area or the final destination or it may simply be the next LIM in sequence on the way to a work station, other processing area or the final destination in future steps.

In step 930, control module 120 determines the direction in which a force should be applied by the LIM to the receptacle to propel it toward its "next location," and in step 932 control module 120 determines the amount of force that should be applied by the LIM to the receptacle (this determination may take into account, for example, the weight of the receptacle, the weight of the contents and/or a desired distance to be traveled). It should also be noted that the particular order of steps 930 and 932 is not critical, and that they may be reversed or combined into a single step, as appropriate. Once the direction and size of the applied force has been determined by control module 120 and that information is sent to signal generation module 134, signal generation module 134, in step 934, generates an appropriate drive signal to be applied to the corresponding LIM. In step 936, the generated signal is transmitted to the appropriate LIM by signal generation module 134 which causes that LIM to generate a magnetic field B that interacts with the conductive portion of the corresponding receptacle to induce a current I, that in turn creates a force F that moves the receptacle to the "next location." The method stops in step 938 (or simply repeats until the outstanding tasks for the receptacle are complete).

The various embodiments described herein may be implemented using a variety of means including, but not limited to, software, hardware, and/or a combination of software and hardware. Furthermore, the above described embodiments are presented for the purposes of illustration and are not to be construed as limitations.

What is claimed is:
1. A materials handling system, comprising:
 a track comprising a receiving surface to move a receptacle along the track from a first position to a second position;
 a plurality of receptacles, each receptacle of the plurality of receptacles comprising a conductive element arranged proximate to the receiving surface of the track, the conductive element comprising at least a conductive material impregnated into a portion of each receptacle;
a plurality of linear induction motors ("LIMs") disposed along the track, each LIM of the plurality of LIMs situated on the track in close proximity to the conductive element of a receptacle passing thereby; and
a control module that controls force produced by a LIM on the conductive element of the receptacle passing thereby, wherein the control module is operable to control the force produced by each LIM independently to propel receptacles independently of each other along the track.

2. The materials handling system of claim 1, wherein each receptacle of the plurality of receptacles is capable of receiving at least one item to be stored therein as the receptacle is moved along the track from the first position to the second position.

3. The materials handling system of claim 1, wherein the conductive element further comprises at least one of:
a conductive plate located on each receptacle.

4. The materials handling system of claim 1, wherein the control module is further configured to:
control the force produced by the LIM on the conductive element of the receptacle passing thereby such that the receptacle moves along the track from the first location to the second location.

5. The materials handling system of claim 1, further comprising:
at least one sensor for measuring a weight of each receptacle.

6. A materials handling system, comprising:
a track for moving a receptacle along a receiving surface of the track, the track comprising a plurality of linear induction motors ("LIMs") disposed along at least a portion of the track; and
a plurality of receptacles configured to receive at least one item, wherein:
each receptacle comprises a conductive element oriented proximate the receiving surface when each receptacle is positioned on the track, the conductive element comprising at least one conductive material included within a non-conductive portion of each receptacle; and
each of the plurality of LIMs are arranged along the track proximate the receiving surface in a configuration to propel receptacles along the receiving surface between at least two positions on the track.

7. The materials handling system of claim 6, wherein the plurality of LIMs are further arranged to control movement of any of the plurality of receptacles between any of the at least two positions.

8. The materials handling system of claim 7, wherein each LIM of the plurality of LIMs is configured to control a corresponding receptacle that is passing by that LIM such that each receptacle of the plurality of receptacles is individually controlled by a LIM of the plurality of LIMs.

9. The materials handling system of claim 6, further comprising:
a plurality of sensors configured to monitor at least one of:
a location of the plurality of receptacles; or
the at least one item received in each of the plurality of receptacles.

10. The materials handling system of claim 6, wherein the plurality of LIMs comprise:
a first group of LIMs configured to move receptacles in a first direction along the track; and
a second group of LIMs configured to move receptacles in a second direction along the track.

11. The materials handling system of claim 10, wherein at least one of the LIMs in the second group of LIMs is operable to cause electromagnetic force to be applied to receptacles passing thereby to change a direction of movement of the receptacles from the first direction to substantially the second direction.

12. A method for controlling a materials handling system, the method comprising:
instructing, by a control module, placement of a receptacle on a receiving surface of a track, the receiving surface of the track comprising a plurality of linear induction motors ("LIMs"), and the receptacle being configured to receive at least one item and comprising a conductive element that is positioned proximate to the receiving surface, the conductive element comprising at least one conductive material included within a non-conductive portion of each receptacle; and
instructing, by the control module, operation of at least some of the plurality of LIMs according to a sequence that causes the receptacle to move in a first direction along the receiving surface via electromagnetic coupling between each one of the at least some of the plurality of LIMs and the conductive element of the receptacle passing thereby.

13. The method of claim 12, wherein instructing operation of at least some of the plurality of LIMs further comprises:
applying an alternating current ("AC") signal to a selected LIM of the plurality of LIMs to generate a magnetic field configured to couple with the receptacle passing thereby to induce a current in the conductive element.

14. The method of claim 12, wherein the applied AC signal is a pulse width modulated ("PWM") signal.

15. The method of claim 14, wherein applying the PWM signal causes eddy currents to be created in the conductive element of the receptacle which interact with the electromagnetic field to create a force that propels the receptacle to move in the first direction.

16. The method of claim 12, further comprising:
sensing, by at least one sensor, at least one of: a location of the receptacle within the materials handling system or the item received in the receptacle.

17. The method of claim 12, further comprising:
diverting, by at least one of the plurality of LIMs, the receptacle from the first direction to a second direction.

18. The method of claim 17, wherein diverting comprises:
applying a first pulse width modulated ("PWM") signal to a selected LIM of the plurality of LIMs to generate an electromagnetic field configured to couple with the conductive element of the receptacle to cause the receptacle passing thereby to move in the second direction.

19. The method of claim 18, further comprising:
applying a second pulse width modulated ("PWM") signal to a selected LIM aligned along the second direction, wherein the second PWM signal generates an electromagnetic field configured to couple with the conductive element of the receptacle to cause the receptacle passing thereby to continue to move along the second direction.

20. A receptacle, comprising:
at least one side wall comprising a non-conductive material; and
a base, wherein:
at least one of the at least one side wall or the base comprises at least one conductive element configured to interact with a linear induction motor ("LIM") when the receptacle is proximate the LIM, the at least one conductive element comprising at least one conductive material included within a non-conductive portion of the base; and the at least one side wall and the base of the receptacle are configured to receive at least one item.

21. The receptacle of claim 20, wherein
the base further comprises the non-conductive material; and
the at least one conductive material included within the non-conductive portion of the base corresponds the at least one conductive material being impregnated into the non-conductive material of the base.

22. The receptacle of claim 20, wherein:
the at least one side wall comprises first, second, third, and fourth side walls;
the first and the second side walls are substantially parallel to one another and the third and fourth side walls are substantially parallel to one another such that the first and second side walls are substantially perpendicular to the third and fourth side walls; and
the base is substantially planar and oriented such that it is substantially perpendicular to the first, second, third, and fourth side walls.

23. The receptacle of claim 20, wherein:
the base further comprises the non-conductive material; and
the at least one conductive element further comprises a plurality of conductive strips interposed within the non-conductive material.

24. The receptacle of claim 20, wherein:
the conductive material comprises at least one of copper, iron, aluminum, or silver.

25. The receptacle of claim 20, wherein the base further comprises an RFID tag configured to be read by an RFID reader to track a position of the receptacle within a materials handling system.

* * * * *